(12) United States Patent
Meyers et al.

(10) Patent No.: US 9,967,437 B1
(45) Date of Patent: May 8, 2018

(54) DYNAMIC AUDIO SYNCHRONIZATION

(71) Applicant: Amazon Technologies, Inc., Reno, NV (US)

(72) Inventors: James David Meyers, Santa Clara, CA (US); Jeffrey O'Neill, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 13/787,114

(22) Filed: Mar. 6, 2013

(51) Int. Cl.
*H04N 5/04* (2006.01)
*H04S 7/00* (2006.01)

(52) U.S. Cl.
CPC .............. *H04N 5/04* (2013.01); *H04S 7/301* (2013.01)

(58) Field of Classification Search
CPC .......... H04S 7/303; H04S 7/302; H04S 7/301; H04S 2420/01; H04R 3/12
USPC ........................................................ 381/303
See application file for complete search history.

(56) References Cited

U.S. PATENT DOCUMENTS

| | | | | |
|---|---|---|---|---|
| 6,901,148 | B2* | 5/2005 | Yoshino | H04S 7/301 381/103 |
| 7,710,826 | B2* | 5/2010 | Jeong | G01S 11/14 367/124 |
| 2004/0071294 | A1* | 4/2004 | Halgas et al. | 381/59 |
| 2004/0183896 | A1* | 9/2004 | Takamine et al. | 348/14.08 |
| 2005/0254662 | A1* | 11/2005 | Blank | H04S 7/301 381/58 |
| 2007/0121955 | A1* | 5/2007 | Johnston et al. | 381/56 |
| 2008/0165979 | A1* | 7/2008 | Takumai | 381/59 |
| 2008/0219099 | A1* | 9/2008 | Novick | G01S 3/8006 367/118 |
| 2009/0172200 | A1* | 7/2009 | Morrison et al. | 709/248 |
| 2009/0282452 | A1* | 11/2009 | Wei | H04N 9/806 725/118 |
| 2010/0142723 | A1* | 6/2010 | Bucklen | 381/81 |

* cited by examiner

*Primary Examiner* — Ahmad F Matar
*Assistant Examiner* — Jirapon Intavong
(74) *Attorney, Agent, or Firm* — Pierce Atwood LLP

(57) ABSTRACT

A method and apparatus for synchronizing media content emitted from various sources is presented. Arrival timing of outputs from the various sources to a particular location is determined and adjusted to reduce synchronization delays at the particular location. Synchronization delays may be determined by detecting the media output from a combination of sources arriving at the location. Control messages are generated by processing the detected output and determining delays to be applied to corresponding sources.

20 Claims, 9 Drawing Sheets

DYNAMIC AUDIO SYNCHRONIZATION

BACKGROUND

Various devices may be configured to receive and play streaming content including audio content and may be configured to communicate streaming content to other devices such as audio speakers throughout a home. Some devices can be configured to stream different audio channels to different speakers in a home, for example. When multiple devices are configured to stream the same media in an environment, various delays in timing from each device may interfere with each other and cause distortions in the content. The increasing use of mobile devices as sources of media content may introduce additional interference and distortions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
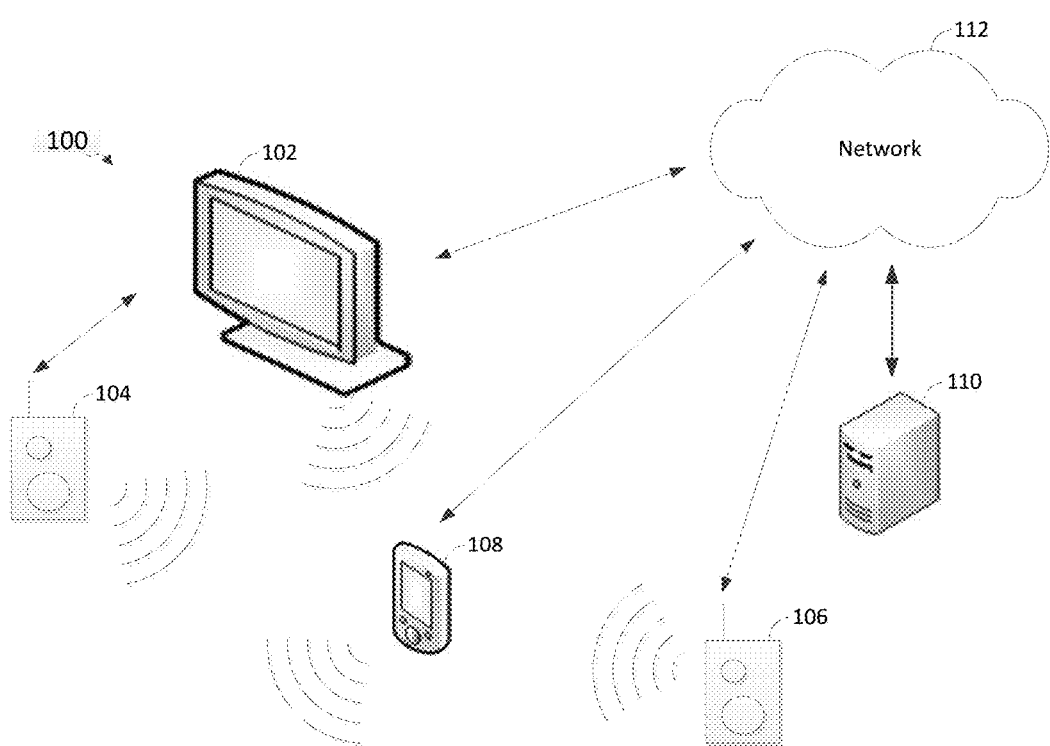
FIG. 1 is a pictorial diagram showing an environment for implementing one aspect of the disclosure.

In certain situations, a user may want to listen to music or watch video on an entertainment system with sound coming from speakers that are located at various locations around a room or in different rooms. The entertainment system may include wireless speakers that are capable of receiving streamed audio signals, for example. The user may experience poor media quality when sound from the various speakers is not time synchronized at the user's location or when audio is not synchronized with video due do speaker positioning and various processing delays in wireless messaging. For example, sounds that are simultaneously emitted from different audio speakers may arrive at a listener at slightly different times depending on a location of the listener relative to the speakers. This dissonance may cause location based audio distortion in the combined sound at the listener's location. Some audio equipment may be configured to apply different time delays to an audio signal being communicated to different speakers. The time delays may be adjusted to reduce distortion in a particular listening location. However, this technique for synchronizing audio speakers may not account for distortion changes when a listener moves to different locations unless the time delays are manually readjusted.

The combined sound from the self-contained speakers and external speakers may be distorted due to lack of synchronization between the external speakers and the device in any given location. It is problematic to configure devices for optimal audio synchronization with external speakers, because devices are more frequently moved to different locations while also emitting audio.

Processing delays may also cause audio content that is streamed to wireless speakers to be out of synchronization with corresponding video content on television display, for example. Additional audio distortion can be caused by processing delays or transmission delays of streamed audio content on wireless audio devices such as smart phones and wireless audio speakers, for example. This additional distortion complicates efforts to mitigate location based audio distortion.

Systems and methods in accordance with various embodiments of the present disclosure may overcome one or more of the above-referenced and other deficiencies in conventional approaches to synchronizing media content. In particular, various aspects allow streamed audio sent to wireless speakers to be synchronized with other devices such as conventional speakers, video displays and mobile devices, for example.

To improve the media quality for a user in the above situations, a system and method is offered that generates control messages that coordinate timing of the media emitted from various speakers and other system components. The control messages may be generated by a device, that senses the user's location or senses the audio and/or video time differences. The device may continuously or periodically send messages to adjust timing of the media emitted from the various system components to reduce or minimize time differences from a user's perspective even as the user changes locations, for example.

The following description provides exemplary implementations of the disclosure. Persons having ordinary skill in the field of computers, audio, and multimedia technology will recognize components and process steps described herein that may be interchangeable with other components or steps, or combinations of components or steps, and still achieve the benefits and advantages of the present disclosure. Moreover, in the following description, numerous specific details are set forth in order to provide a thorough understanding of the disclosure. It will be apparent to one skilled in the art, however, that the disclosure may be practiced without some or all of these specific details. In other instances, well-known process steps have not been described in detail in order not to unnecessarily obscure the disclosure.

It should also be understood that the following description is presented largely in terms of logic and operations that may be performed by conventional computer components and multimedia system components. These computer components, which may be grouped in a single location or distributed over a wide area, generally include computer processors, memory storage devices, display devices, input devices, audio speakers, etc. In circumstances where the computer components are distributed, the components may be accessible to each other via wired and/or wireless communication links, for example.

Although media content is described in several aspects of the present disclosure in the form of an audio stream, the present disclosure is not so limited. More particularly, in addition to processing audio streams, the present disclosure may be applied to synchronization of multiple outputs of the same or different media content and may include synchronization of audio and video signals, for example. Accordingly, while examples in the subsequent discussion are presented in regard to audio synchronization and streamed media generally, it should be appreciated that aspects of the present disclosure may be applied to many types of media content.

FIG. 1 illustrates one environment for implementing a synchronization technique according to aspects of the present disclosure. As will be appreciated, different environments may be used, as desired, to implement different embodiments of the disclosure. The environment shown includes an entertainment system 100 including various electronic devices that are able to output audio and/or video media to a user. The entertainment system 100 may include one or more video display devices such as a television monitor 102 and one or more audio speakers 104, 106 located at various distances from the television monitor 102 and various distances from a user. The television monitor 102 may also include one or more internal speakers. A device 108, such as a smart phone, for example, may be configured to communicate wirelessly or via direct connections with the entertainment system 100. In one aspect of the disclosure, the wireless device 108 may operate as a source for media to be output by the entertainment system 100. In another aspect of the disclosure, the wireless device 108 may output audio and/or video media received from the entertainment system 100, for example. The environment shown in FIG. 1 may also include one or more computer systems 110 configured for communicating with the entertainment system 100 and the device 108. The computer system may be configured to store media content and/or to control portions of the entertainment system 100.

Communication between the television monitor 102, speakers 104, 106, device 108, computer system, 110 or any combination of the various electronic user devices may be performed via a network 112, such as a local wireless network, and/or wide area networks such as the Internet, for example. The network 112 may include various wireless links, such as local WiFi connections for example, and may also include wired links such as links to external networks and/or the Internet. Protocols and components for communicating via local wireless networks and wide area networks such as the Internet are well known to those of ordinary skill in the art of computer network communications.

According to aspects of the present disclosure, synchronization of media content at one or more locations may be improved by controlling timing of the audio content emitted by the various speakers 104, 106 and/or and by controlling timing of the video content displayed on the television monitor 102 or other display devices. Sensing of the media content at a particular location may be performed using one or more microphones and/or cameras incorporated in the device 108, for example. The synchronization of various components of sound and/or video content sensed by the microphone(s) and/or camera(s) of the device 108 may be analyzed to compute timing adjustment messages for the speakers 104, 106, television monitor 102 and/or other display devices.

Figure 2:
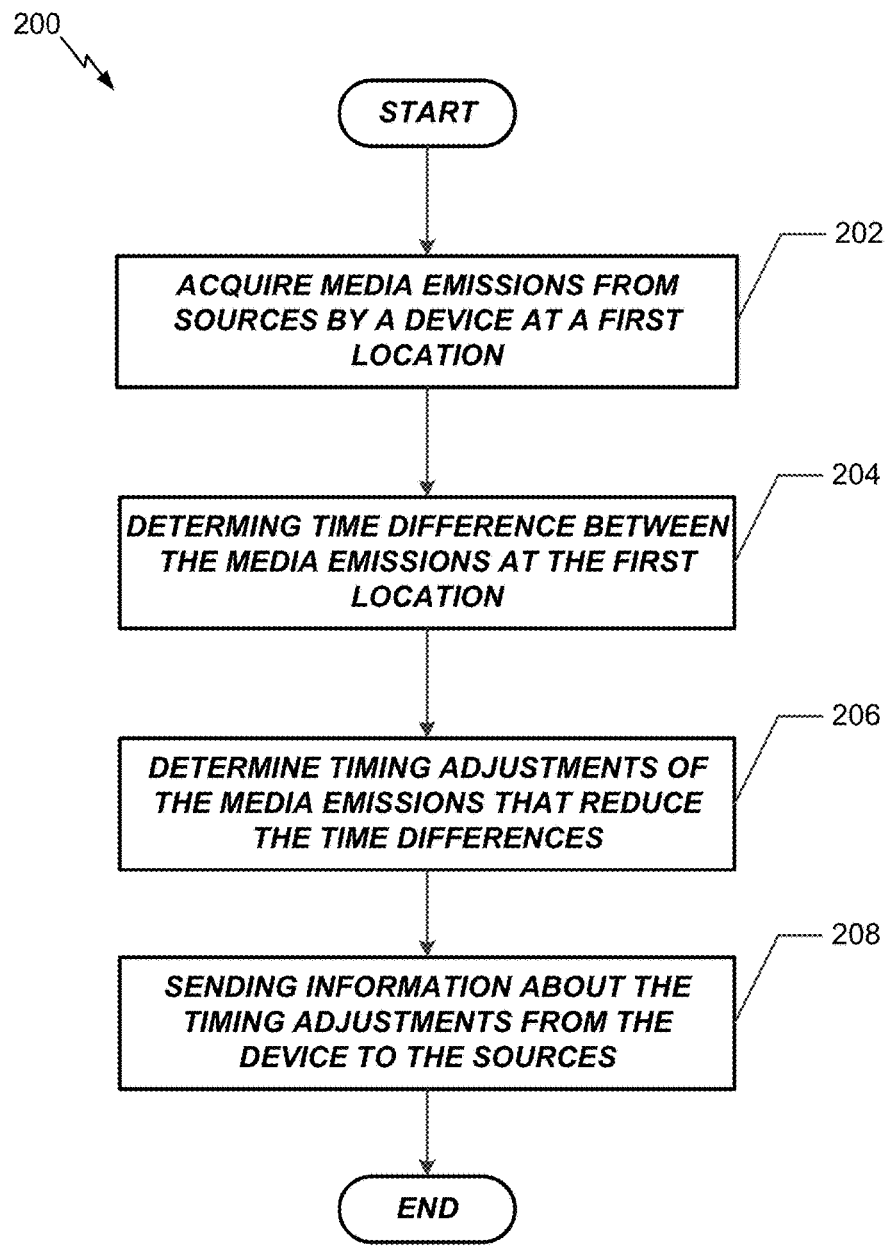
FIG. 2 is a flow diagram illustrating an exemplary routine for synchronizing media content according to aspects of the present disclosure.

A synchronization method according to one aspect of the present disclosure is described with reference to the process flow diagram 200 shown in FIG. 2. At block 202, the method includes acquiring one or more media outputs from one or more sources by a device at a first location. The media sources may include wireless speakers such as the speakers 104, 106 illustrated in FIG. 1, for example. At block 204, the method includes determining time differences between the media outputs at the first location. At block 206, the method includes determining timing adjustments of the media outputs that reduce the time differences at the first location. At block 208, the method includes sending information about the timing adjustments from the device to the one or more sources.

The information about the timing adjustments may be sent directly to the one or more sources, or may be sent to one or more controllers that may be configured to adjust timing of the one or more sources in response to the information, for example. According to one aspect of the disclosure, the information about timing adjustments may be sent as messages that include only the time difference determined by the device. In this aspect, the one or more sources, and/or controllers may perform processing based on the time difference to determine timing adjustments. According to another aspect of the present disclosure, processing may be performed by the device based on the time difference to determine timing adjustments. In this aspect, the information about timing adjustments may be sent as messages that include sufficient information for the sources and/or controllers make the timing adjustments without much further processing, for example.

According to one aspect of the disclosure the timing adjustments may be determined based on the location of the device. The location of the device may be determined by various known techniques such as determining latencies in various communication links with the device, such as WiFi communication links, for example. Techniques to determine location may be based on triangulation, time of arrival, and time difference of arrival, for example. In larger environments such as a concert arena, other location techniques, such as global positioning system (GPS) techniques, may be used to determine the device location, for example. Various location techniques may also be combined to obtain a precise location, either absolute or relative to various other media emitting sources.

According to another aspect of the disclosure, the timing adjustments can be determined based on identifying sources of the media outputs received at the location of a sensor such as a microphone and/or camera in a device. The contribution of the one or more of the identified sources with respect to the time differences may be determined. Timing adjustments for a particular source, such as a wireless speaker or video monitor, can be determined based on the contribution of source to the time differences.

In one example, according to this method a first time difference is determined between an audio portion and a video portion of media content such as a movie as experienced at the location of a device. Sensing of the audio portion of the content may be performed by a microphone on the device, for example. Sensing of the video portion of the content may be performed by a camera on the device. A timing adjustment may be determined to reduce the time differences between the audio portion and the video portion of the media content that are sensed by the device. Messaging of the timing adjustment may then be sent from the device to the video source either directly or through one or more components of the system 100 which may assist with the synchronization. In one example, the timing adjustment may be configured to delay the video portion by an amount corresponding to transmission delays and processing delays of the audio portion that are introduced by communication links with wireless speakers, for example.

Figure 3:
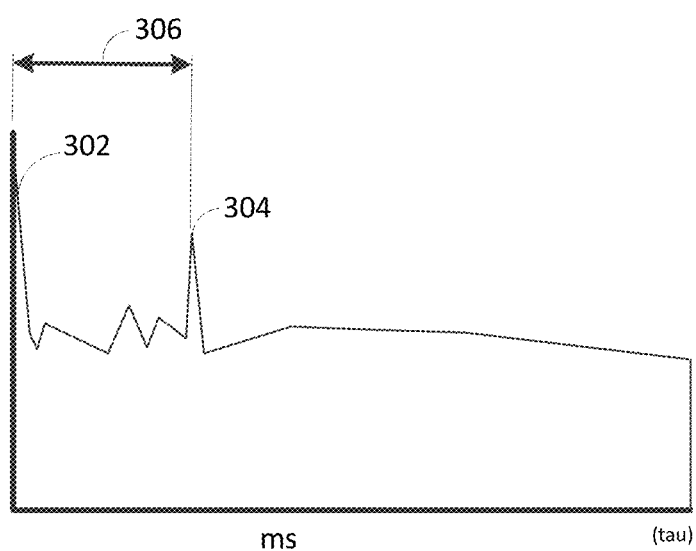
FIG. 3 is a waveform diagram illustrating a technique for determining delay between outputs according to aspects of the present disclosure.

According to an aspect of the present disclosure, a time difference between a first audio source emitting a first audio signal and a second audio source emitting a second audio may be determined by performing an auto-correlation of the audio signal received by a microphone (on a device for example). An auto-correlation of the received signal, represented as x(t), may be represented as $r_x(tau)$, and the auto-correlation indicates, in an approximate sense, a level of similarity between the signal x(t) and a delayed version of the signal x(t−tau). Where the first signal and the second signal (from the two audio sources) are similar but one is shifted in time from the other, the auto-correlation will show a peak at tau equals zero (because the received signal is similar to itself) and a second peak at a value of tau corresponding to the time delay between the two signals. FIG. 3, shows an example of an auto-correlation with a primary peak 302 at tau equals zero and an offset peak 304 at the time difference 306.

The value of tau at the offset peak corresponds to a time difference between the first audio signal and the second audio signal, and this value of tau may represent the determined time difference. To correct the time difference between the first audio signal and the second audio signal, a time delay corresponding to the determined time difference can be added to the earlier of the two signals. It may not be known which of the two signals is earlier and thus it may not be known which of the two signals should be delayed to synchronize them. The two signals may be synchronized through a trial and error process. If the correct signal is delayed, then the offset peak will disappear from the auto-correlation, if the incorrect signal is delayed the offset peak will be shifted to twice the value of tau as before.

The control of the timing of the first signal and the second signal may be performed by the same device or a different device. Where the same device controls the timing, it can delay the first signal directly. Where another device controls the timing, a message may be sent to the other device to instruct the other device to delay the first audio source by an amount corresponding to the determined time difference. A post-adjustment auto-correlation may then be performed to confirm that the delay was applied to the correct audio source. If the post-adjustment auto-correlation indicates an increased time difference, for example, then the timing adjustment should be applied to the second audio source and the timing adjustment that had been applied to the first audio source should be reversed.

This technique may also be applied in a straightforward manner to environments including more than two audio sources. For example, if there are N sources, then the auto-correlation signal may have up to $N(N-1)/2$ offset peaks. The process above can be applied iteratively to one offset peak at a time. In some aspects, the offset peak with the largest magnitude may be selected first. For each offset peak, the timing of one of the N sources may need to be delayed, and the trial and error process may be extended to sequentially delaying the N sources until one is found that reduces the total number of offset peaks. This technique may also be extended to video signals.

According to one aspect of the present disclosure, a different source-specific signal may be embedded with a media stream being communicated to each speaker and/or video display that presents the media stream. The source-specific signal may be applied to different audio output channels, for example. In another example, each wireless speaker may be configured to superimpose a self-identification signal upon its audio output. The self-identification signal may be outside of the frequency range that is audible to humans but within the detectable frequency range of a microphone in a wireless device, for example. In another example, the self-identification signal may be within the frequency range that is audible to humans, but embedded with audio signals at frequencies of the audio signal that have high energy. In this example, the self-identification signal may be masked by the high energy portion of the audio signal and may be substantially unnoticeable to listeners. In yet another example, the self-identification signal may be a spread spectrum signal that is substantially inaudible to humans. According to one aspect of the disclosure, the source specific signal may include two or more audio impulses with a source-specific time delay between impulses. In this aspect, because the impulses may be noticeable to listeners, the source-specific signal may only be imposed on audio signals during a calibration process, for example. The source specific signal may be emitted continuously or periodically to allow time for receiving, processing and adjusting audio form other sources in the environment, for example.

The presence and time-delay of the source-specific signals may be identified by using a matched filter. For example, a received signal may be a combination of N signals from N sources, and may contain a source-specific signal for each source. The source-specific signals may be used in a calibration mode when other audio is not being played or may be used during normal operation where the source-specific signals are combined with music or other audio. Applying a matched filter for a first source-specific signal provides a time delay for that source and also identifies the source corresponding to the delay. This process can be repeated for each of the N sources, and N−1 one the sources can be delayed to correspond to the $N^{th}$ source.

In another example, according to one aspect of the present disclosure, a source-specific signal may be emitted by a particular master source. The master source may be any one of the sources described above, for example. In this example, each other source may be configured to recognize the master source-specific signal and adjust their own timing based on the timing of the master source-specific signal.

According to one aspect of the present disclosure, the first and second output of media content may be emitted from the same device. For example, the first output may be video from a television and the second output may be audio output from the television. In another example, the second output of media content is emitted from a second device at a second location. For example, the first device may be a fixed speaker and the second device may be a speaker on a device. In yet another example, media content is emitted from a second device at a location different from the location of the first device and the listener. For example, the first device and second device may be speakers in separate locations that are both located at a distance from the listener.

According to an aspect of the disclosure, the distance between the first location and the second location is determined. The arrival timing of media emitted from a device at the first location to the second location is determined based on the determined distance. In one example, the distance may be determined by location sensing techniques applied to one or more devices at the first location and/or the second location. Various location sensing techniques are well known and may include techniques based on message latencies or global positioning system (GPS) techniques, for example.

According to another aspect of the present disclosure, the arrival timing of different media emitted from a device at the first location to the second location may be determined by computing processing delays and/or network latencies that affect the device. The arrival timing of media outputs from various devices to any given location may be projected with knowledge of corresponding processing delays and network latencies that affect the devices. Processing delay data and network latency data for the various devices may be compiled and stored in a database that is accessible via the network, 112, for example.

Figure 4A:
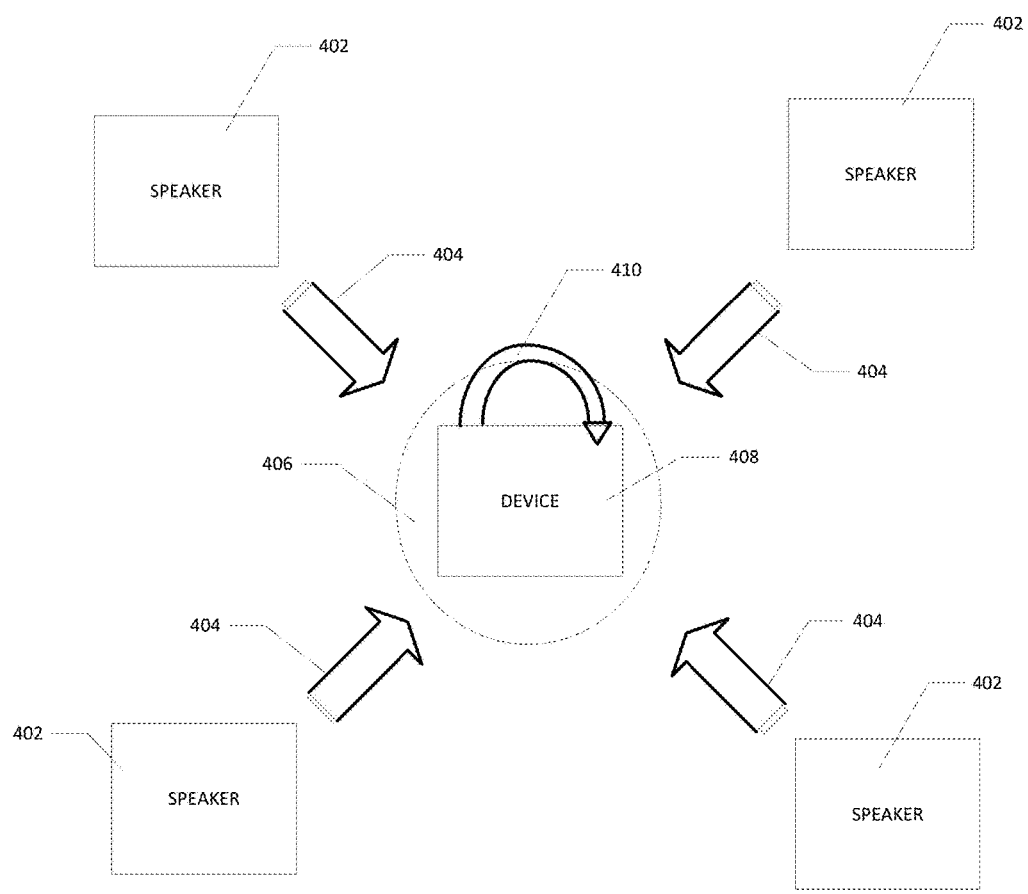
FIGS. 4A-C are pictorial diagrams showing environments for implementing aspects of the present disclosure.

One example of an environment in which aspects of the present disclosure are implemented is described with reference to FIG. 4A. In this example, an entertainment system includes a number of speakers 402, in fixed locations in a room. The entertainment system is configured so that audio 404 that is emitted from each the speakers 402 is synchronized at a central listening location 406 in the room. A device 408 is also used at the listening location 406 as an additional speaker. However, audio 410 that is emitted from the device 408 is not initially synchronized at the central listening location 406 with the audio 404 that is emitted from the fixed location speakers 402. According to aspects of the present disclosure, one or more microphones on the device 408 sense the audio 404 from the fixed speakers 402. The device determines the time difference between the audio 404 sensed at the central listening location 406 from the fixed speakers 402 and the audio 404 that is emitted from the device. A control message may be generated by the device 408 or other devices in the entertainment system based on the difference. The control message causes a delay to the audio 404 emitted by the fixed speakers 402 by an amount corresponding to the time difference, if the audio 404 emitted from the fixed speakers 404 is advanced relative to the audio 410 emitted from the device 408. If the audio 410 emitted from the device 408 is advanced relative to the audio 404 emitted from the fixed speakers 402, the control message causes the delay to the audio 410 emitted from the device 408.

Figure 4B:
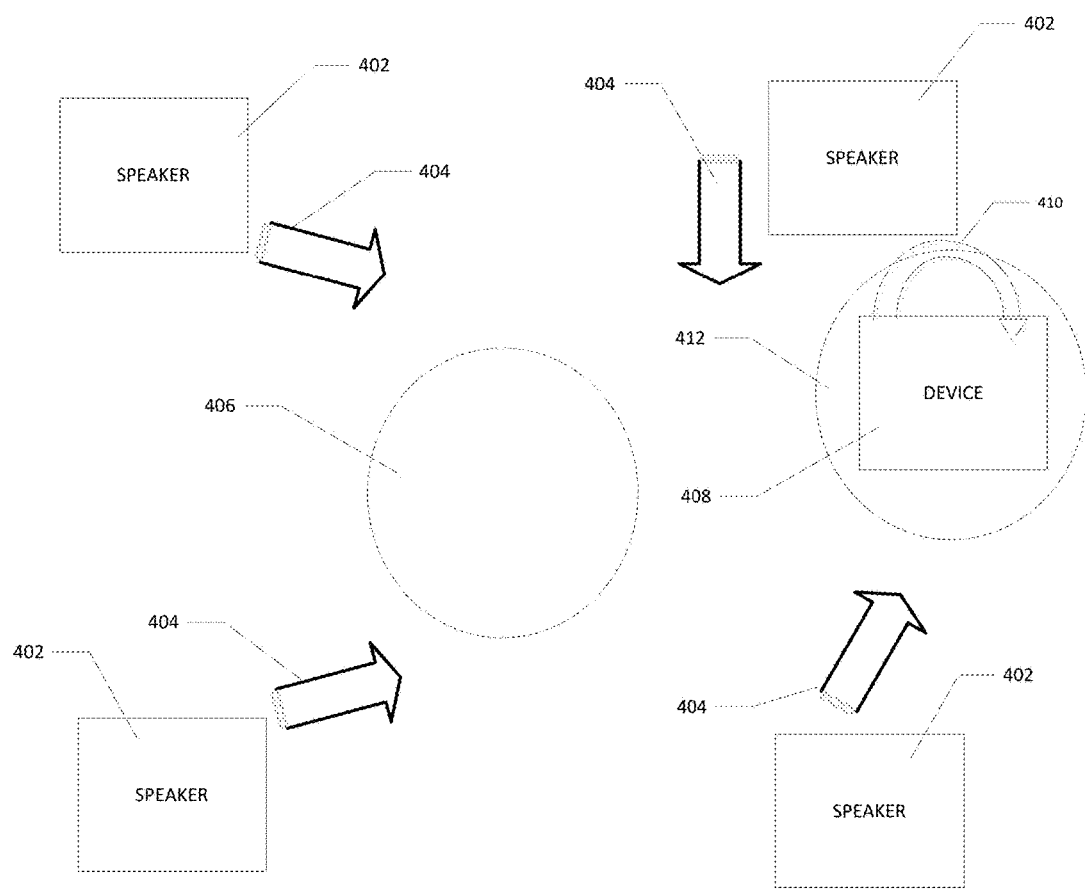

Another example of an environment in which aspects of the present disclosure are implemented is described with reference to FIG. 4B. The entertainment system includes the speakers 402 in fixed locations in the room and is configured so that audio 404 that is emitted from each the speakers 402 is synchronized at the central listening location 406 in the room. However, in this example, the device 408 is located at an alternate listening location 412 rather than the central listening location 410. At the alternative listening location 406, the audio 404 emitted from the fixed speakers 402 is not synchronized. According to aspects of the present disclosure, one or more microphones on the device 408 sense the audio 404 from the fixed speakers 402. The device determines the time differences between audio 404 sensed from the respective fixed speakers 402. One or more control messages are generated to introduce corresponding delays to respective audio 404 emitted from respective fixed speakers 402 so that the time differences between the fixed speakers 402 at the alternate listening location 412 is reduced or eliminated.

According to another aspect of the present disclosure, the device 408 may also be used at the alternate listening location 412 as an additional speaker. Audio 410 that is emitted from the device 408 is not initially synchronized at the alternate listening location 412 with the audio 404 that is emitted from any of the fixed location speakers 402. According to aspects of the present disclosure, the device determines the time differences between the audio 404 sensed at the listening location 406 from the fixed speakers 402 and the audio 404 that is emitted from the device. The control messages can be generated by the device 408 or other devices in the entertainment system based on the difference. The control message may be continuously or periodically updated to maintain audio synchronization at the alternate listening location 412 even as the device 408 is moved from one alternate listening location 412 to another, for example.

Figure 4C:
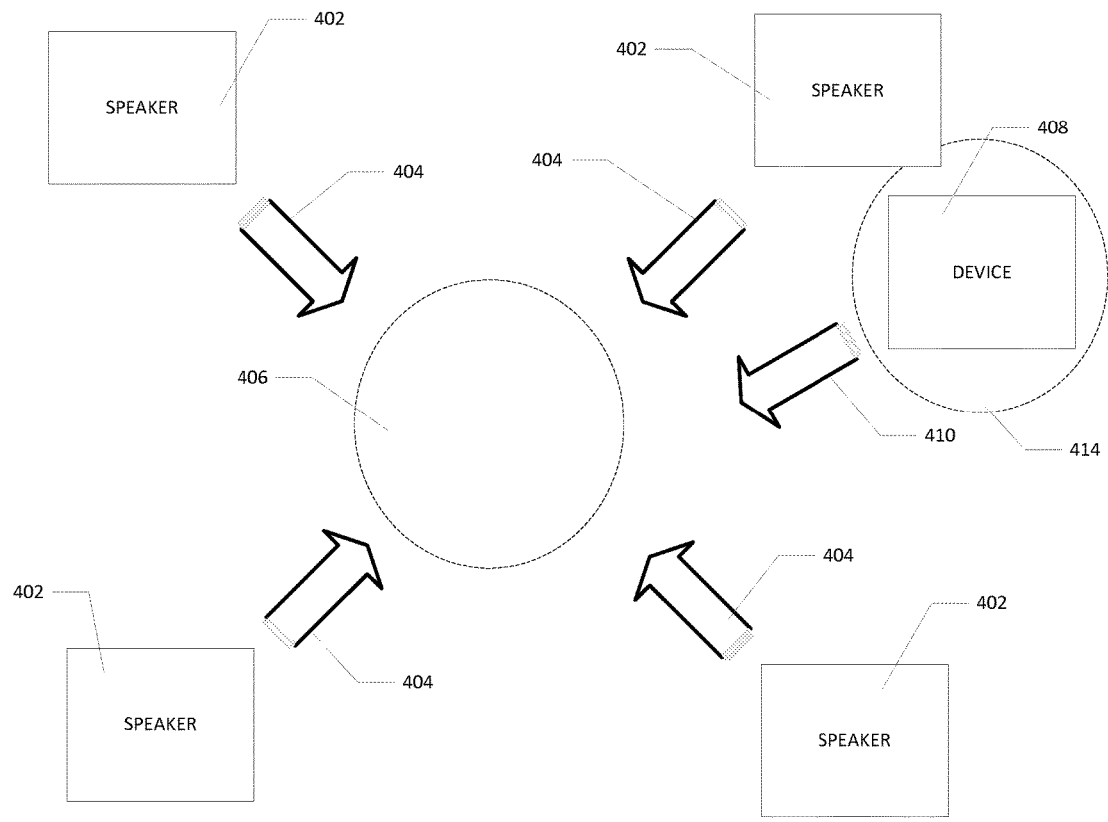

Yet another example of an environment in which aspects of the present disclosure are implemented is described with reference to FIG. 4C. The entertainment system includes the speakers 402 in fixed locations in the room and is configured so that audio 404 that is emitted from each the speakers 402 is synchronized at the central listening location 406 in the room. A device 408 is used as an additional speaker. However, in this example, the device is located at a mobile speaker location 414 rather than at the central listening location 406. The audio 410 that is emitted from the device 408 is not initially synchronized at the central listening location 406 with the audio 404 that is emitted from the fixed location speakers 402. According to aspects of the present disclosure, a control message is generated based on the mobile speaker location 414. The control message may cause a delay to the audio 404 emitted from the fixed speakers 402 or the audio 410 emitted from the device 408 to reduce or eliminate time differences between the audio 404 emitted from the fixed speakers 402 and the audio 410 emitted from the device 408 at the central listening location 406. The control message may be continuously or periodically updated to maintain audio synchronization at the central listening location 406 even as the device 408 is moved from one mobile speaker location 414 to another, for example. In this example, the delay to be applied to reduce or eliminate time differences may be computed based on the distances between each speaker 402 and the fixed location 406 and between the device 408 and the fixed location 406, for example. Additional delay may be applied to the audio 404 emitted from the fixed speakers 402 and/or the audio 410 emitted from the device 408 to compensate for processing delays and network latencies, for example. In this example, because direct feedback is not available from the central location 406 to provide real time knowledge of processing and network latencies, previously computed processing delay information may be imposed. The previously computed processing delay information may be stored locally, on speakers 402, on the device 408 and/or on one or more controllers configured to adjust audio timing of the speakers 402 and/or device 408. The previously computed processing delay information may also be obtained from a database that is accessible via the network, 112, for example.

Figure 5:
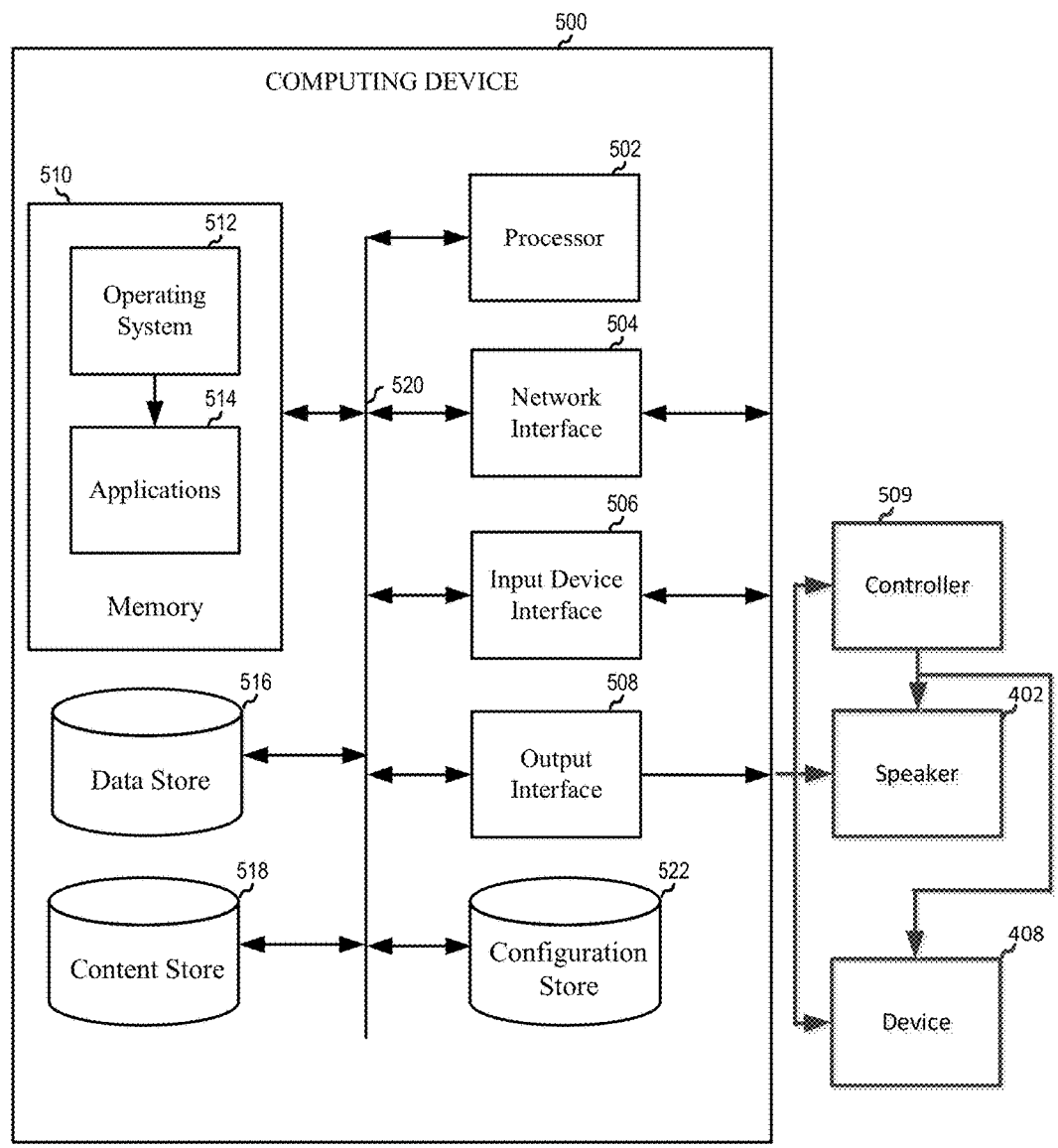
FIG. 5 is a block diagram depicting an arrangement of certain computing components for implementing aspects of the present disclosure.

Processing audio and video content received from various sources according to various aspects of the present disclosure may be conducted on a variety of computing devices and configurations. These computing devices may include, but are not limited to, mobile phones, laptop computers, tablet computers, personal computers, workstations, mini- and mainframe computers, servers, and the like. These computing devices may also include specially configured computers for processing digital multi-media content. The general architecture of a suitable computing device is described below in regard to FIG. 5. More particularly, FIG. 5 is a block diagram illustrating exemplary components of a computing device 500 suitable for processing streamed media content. However, the following description of the exemplary components of a computing device 500 should be viewed as illustrative only and not construed as limiting in any manner. In one aspect, the device 108 or the computer system 110 shown in FIG. 1 may be implemented as the exemplary computing device 500, for example. In another aspect, the exemplary computing device 500 or components of the exemplary computing device 500 may be implemented locally in the speaker 104, 106 or television monitor 102 as shown in FIG. 1, for example.

With regard to FIG. 5, the exemplary computing device 500 may include a processor 502 in communication with a variety of other components over a system bus 520 or through a direct connection. These other components may include, by way of example, a network interface 504, an input device interface 506, a display interface 508, and a memory 510. As appreciated by those skilled in the art, the network interface 504 enables the computing device 500 to communicate data, control messages, data requests, and other information with other resources including computers, data sources, storage devices, and the like, on a computer network such as the Internet. The network interface 504 may be configured to communicate via wired or wireless connections. As one skilled in the art will appreciate, the computing device 500 may obtain a media content, such as streamed audio and/or video from another computer, a storage device, or other source via the computer network. The computing device 500 may also save the media content to a networked location or send it to another computer on the network, for example.

The input device interface 506, sometimes also embodied as an input/output interface, enables the computing device 500 to obtain data input from a variety of devices including, but not limited to, a microphone, a digital pen, a touch screen, a keyboard, a mouse, a scanner, and the like. In addition to the exemplary components described above, an output interface 508 may be used for outputting information such as audio delay information and control messages or display information. Audio delay information and/or control messages may be output to speakers 402, device 408 and/or to one or more controllers 509 configured to adjust audio timing of the speakers 402 and/or device 408, for example. Display information may output by the output interface 508 via a display device (e.g., a monitor or similar device, not shown), for example. Audio output may also be output by the output interface 508 to an audio device such as a speaker 402, for example. Of course, while not shown, one skilled in the art will appreciate that one or more speakers 402, devices 408, controllers 509 and/or display devices may be incorporated as an integral element within a computing device 500 or may be separate therefrom.

The processor 502 may be configured to operate in accordance with programming instructions stored in a memory 510. The memory 510 generally comprises RAM, ROM, and/or other memory. Thus, in addition to storage in read/write memory (RAM), programming instructions may also be embodied in read-only format, such as those found in ROM or other permanent memory. The memory 510 may store an operating system 512 for controlling the operation of the computing device 500. The operating system may be a general purpose operating system such as a Microsoft Windows operating system, a UNIX operating system, a Linux operating system, or an operating system specifically written for and tailored to the computing device 500. Similarly, the memory 510 may also store user-executable applications 514, or programs, for conducting various functions on the computing device 500. For example, the application 514 in memory 510 may be configured according to aspects of the present disclosure to synchronize streamed media at a device location.

The computing device 500 optionally includes a data store 516, a content store 518, and/or a configuration store 522, depending on how the computing device 500 is to be used. For example, if the computing device 500 is a device 108 as shown in FIG. 1 it may include the data store 516, the content store 518 and the configuration store 522. If the computing device 500 is configured on a wireless speaker 104, 106 as shown in FIG. 1, it may include the configuration store 522 without an additional content store 518, or a data store 516, for example.

The data store 516 may store known system timing delays such as processing delays and network latencies that may be used to determine the timing adjustment messages according to aspects of the present disclosure. The content store 518 may be used to store the streamed media content that is transmitted and/or received by the computing device 500. The configuration store 522 may store timing delay messaging or the self-identification message of the computing device, for example.

A synchronization system suitable for synchronizing streamed media according to aspects of the present disclosure may be implemented in a single application or module implemented on a computing device 500, in a plurality of cooperating applications/modules on a single computing device, or in a plurality of cooperating applications and/or modules distributed in a computer network.

A synchronization system suitable for identifying time differences in sensed media outputs may be implemented in a single application or module implemented on an entertainment system 100, a device 108 or a computer system 110 (FIG. 1), in a plurality of cooperating applications/modules on a single computing device, or in a plurality of cooperating applications and/or modules distributed in a computer network, for example. Components of the synchronization system may be identified with regard to various logical components. To that end, FIG. 6 is a block diagram illustrating logical components of a synchronization system 600 for adjusting the timing of outputs from various media sources according to aspects of the present disclosure.

Figure 6:
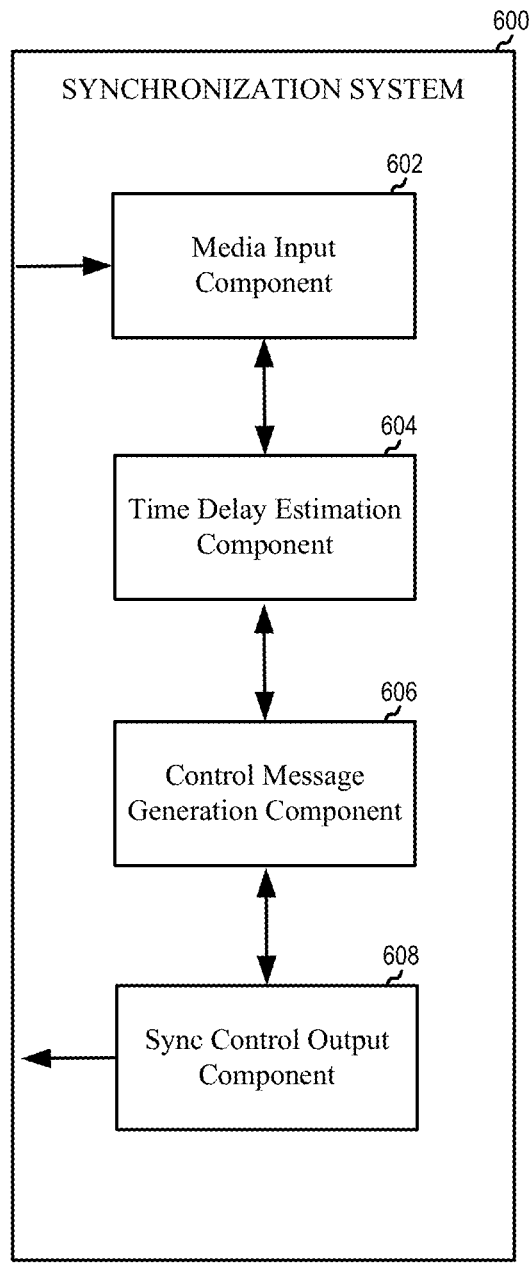
FIG. 6 is a block diagram illustrating logical components of a synchronization system according to aspects of the present disclosure.
Figure 7:
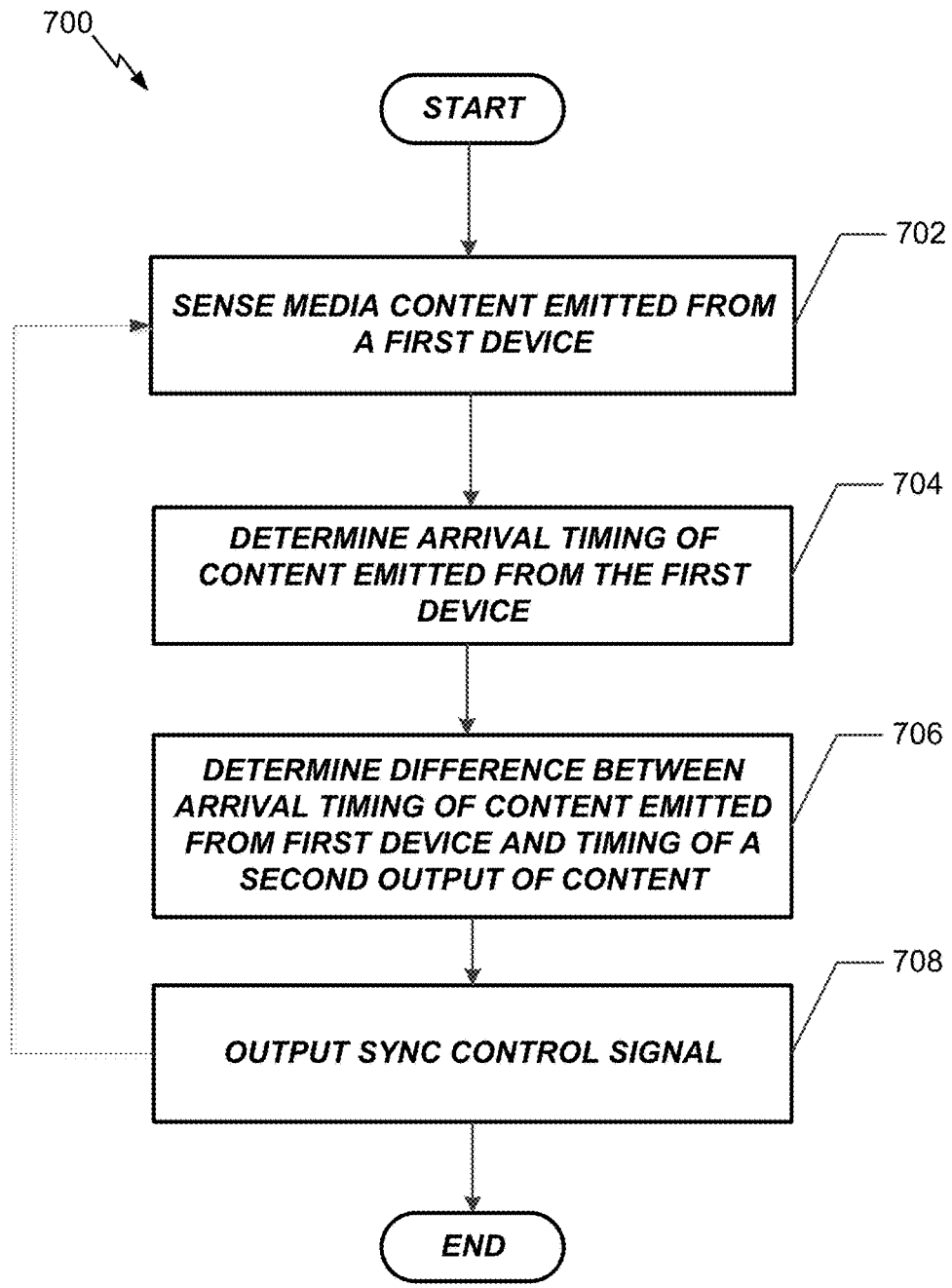
FIG. 7 is a flow diagram illustrating an exemplary routine for synchronizing media content according to aspects of the present disclosure.

With regard to the exemplary routine 700 of FIG. 7, and with further reference to the synchronization system 600 of FIG. 6, at block 702, the media input component 602 senses a media content emitted from two or more devices. The media input component 602, may be a microphone of a device 108 (FIG. 1) sensing an audio output from a wireless speaker 104/106 (FIG. 1), for example. As noted, however, the media content may be obtained from a variety of sources, including one or more microphones or cameras in the device 108 or microphones in wireless speakers 104, 106, (FIG. 1) for example.

At block 704, the synchronization system 600, via the time delay estimation component 604, determines a time delay between media content emitted from two devices. At block 706, the synchronization system 600, via a control message generation component 606 determines a difference between the arrival timing of the first output and an arrival timing of a second output of media content. The second output of media content may be sensed output that was emitted from a second device, or may be output yet to be emitted, for example, in which the arrival time is predicted by the control message generation component 606.

At block 708, the synchronization system 600, via a sync control output component 608, outputs a control message to automatically adjust the arrival timing of the second output of media content. The control message may be computed to reduce the difference between the arrival timing of the first output of media content and the arrival timing of the second output of media content. Adjusting the arrival timing of the second output, in which the second output was determined to have arrived earlier than the first output, may be performed by adding a time delay to the source of the second output for example. The control message may be transmitted wirelessly to wireless speakers 104, 106, television monitor 102, or device 108, for example. According to aspects of the present disclosure, the control message may be communicated to various components of system such as the entertainment system 100 that are not shown. For example, the timing control message may be communicated to a wireless media controller that is configured to control timing of audio and video streams to distributed devices.

According to one aspect of the disclosure, after outputting the control message by the sync control output component 608, the exemplary routine 700 terminates. According to another aspect of the disclosure, the exemplary routine may return to block 702 and repeat periodically or continuously, to maintain media synchronization as conditions change, and to improve media synchronization when previous adjustments were not completely successful to properly synchronize the media content. For example, continuous repetition of the exemplary routine can maintain synchronization of media experienced by a user as the user moves about the environment.

As discussed above, the various embodiments may be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and protocols. Such a system also may include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of communication, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle, Microsoft, Sybase, and IBM.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad, or microphone), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method of synchronizing audio output signals, comprising:
   detecting, by a microphone of a device at a first location, first audio output from a first speaker at a second location, wherein the first audio is based on a first audio signal input to the first speaker by a first source device;
   detecting, by the microphone, second audio output from a second speaker at a third location, wherein the second audio:
      is based on a second audio signal input to the second speaker by a second source device,
      is similar to the first output audio sound, and
      as acquired by the microphone, has a first time delay relative to the first output audio;
   receiving, by synchronization logic of the device, a combined audio signal from the microphone, the combined audio signal representing at least a portion of the first output audio and at least a portion of the second output audio;
   performing, by the synchronization logic, an auto-correlation of the combined audio signal, the auto-correlation outputting an auto-correlation signal that has a plurality of peaks in magnitude over time, the auto-correlation signal indicating a level of similarity between the combined audio signal and time-delayed versions of the combined audio signal, the plurality of peaks including a first peak and at least one offset peak shifted in time relative the first peak;
   selecting, by the synchronization logic, a second peak of the at least one offset peak that has a largest magnitude of the at least one offset peak;
   determining, by the synchronization logic, a first time difference between the first peak and the second peak, the first time difference corresponding to the first time delay;
   sending, from the synchronization logic, to the first source device, a timing adjustment message including information indicative of the first time difference; and
   delaying, by the first source device, the first audio signal input based on the timing adjustment message to reduce the first time delay,
   wherein the first source device and the second source device are different devices receiving a same media content, the first audio signal input and the second audio signal input being audio from the same media content.

2. The method of claim 1, further comprising:
   determining a first timing adjustment to configure a controller of the first source device to delay the first audio signal to reduce the first time difference,
   wherein the information indicative of the time difference comprises the first timing adjustment.

3. The method of claim 2, further comprising:
   detecting, in the combined audio signal, a speaker-specific message embedded in the first output audio; and
   identifying the first output audio based on the speaker-specific message,
   wherein determining the timing adjustment is based in part on having identifying the first output audio.

4. The method of claim 1, comprising:
   determining a second time difference between the first output audio and a video output signal;
   determining a first timing adjustment to reduce the second time difference; and
   sending, from the device to a source of the video output signal, the timing adjustment message including the first timing adjustment.

5. The method of claim 1, wherein the first location, second location, and third location are separate locations.

6. A method of synchronizing audio output signals, comprising:
   receiving, by a microphone of a device at a first time, a first output audio sound from a first speaker, wherein the first output audio sound is based on a first audio signal input at a second time instance to the first speaker;
   receiving, by the microphone at the first time, a second output audio sound from a second speaker, wherein the second output audio sound is based on a digitally processed second audio signal, the digitally processed second audio signal including a processing delay relative to the second time instance;
   receiving, by synchronization logic of the device, a combined audio signal from the microphone, the combined audio signal being based on the first output audio sound and the second output audio sound, wherein the second output audio sound, as represented in the combined audio signal, exhibits a first time delay relative to the first output audio sound;
   producing, by the synchronization logic, an auto-correlation of the combined audio signal, the auto-correlation outputting an auto-correlation signal indicating a level of similarity between the combined audio signal and time-delayed versions of the combined audio signal;
   determining, by the synchronization, a first time difference between the first output audio sound and the second output audio sound based on the auto-correlation signal; and
   sending, from the synchronization logic to a first source of the first audio signal input, a first timing adjustment message including information indicative of the first time difference.

7. The method of claim 6, further comprising:
   determining a timing adjustment to configure a controller of the first source to delay the first audio signal input to reduce the first time difference,
   wherein the information indicative of the first time difference comprises the timing adjustment.

8. The method of claim 7, comprising:
   sensing, in the combined audio signal, a first source-specific sound in the first output audio sound; and
   identifying the first output audio sound based on the sensing of the first source-specific sound,
   wherein determining the timing adjustment is based in part on having identified the first output audio sound.

9. The method of claim 6, comprising wirelessly receiving, by the second speaker, the digitally processed second audio signal.

10. The method of claim 6, further comprising:
   acquiring a first video output from a first video display by a camera, wherein the first video output is based on a first video signal input to the first video display;
   determining a second time difference between the first video output and the second output audio sound;
   determining a second timing adjustment that reduces the second time difference between the first video output and the second output audio sound; and sending the timing adjustment message including the second timing adjustment from the device to a source of the first video output.

11. The method of claim 6, further comprising:
receiving, by the microphone at the first time, a third output audio sound from a third speaker, wherein the third output audio sound is based on a third audio signal input to the third speaker at the second time instance, and the combined audio signal is further based on the third output audio sound;
determining a second time difference between the first output audio sound and the third output audio sound; and
transmitting, to one or more of the first source, a second source of the second audio signal input, and a third source of the third audio signal input, a second timing adjustment message including information indicative of the second time difference.

12. The method of claim 11, wherein one of the first speaker, the second speaker, and the third speaker is part of the device, and each of the other speakers are separate from the device and each other, and are located at different locations.

13. The method of claim 6, further comprising:
receiving the timing adjustment at the first source;
delaying, by the first source, outputting of the first audio signal input at a second time instance; and
determining, by the device, that sending the first timing adjustment message produced a second time difference between the first output audio sound and the second output audio sound as received in the combined audio signal from the microphone, the second time difference being less than the first time difference.

14. The method of claim 6, wherein the auto-correlation signal has a plurality of peaks in magnitude over time, the plurality of peaks including a first peak and at least one offset peak shifted in time relative to the first peak, and the method further comprises:
selecting, by the synchronization logic, a second peak of the at least one offset peak that has a largest magnitude of the at least one offset peak; and
determining, by the synchronization logic, the first time difference between the first peak and the second peak, the first time difference corresponding to the first time delay.

15. A computing device, comprising:
at least one processor;
a memory device including instructions operable to be executed by the at least one processor to perform a set of actions, configuring the at least one processor to:
receive, from a microphone, a first output audio sound from a first speaker, wherein the first output audio sound is based on a first audio signal input at a second time instance to the first speaker;
receive, from the microphone, a second output audio sound from a second speaker, wherein the second output audio sound is based on a digitally processed second audio signal, the digitally processed second audio signal including a processing delay relative to the second time instance;
receive a combined audio signal from the microphone, the combined audio signal being based on the first output audio sound and the second output audio sound, wherein the second output audio sound, as represented in the combined audio signal, exhibits a first time delay relative to the first output audio sound;
produce an auto-correlation of the combined audio signal, the auto-correlation outputting an auto-correlation signal indicating a level of similarity between the combined audio signal and time-delayed versions of the combined audio signal;
determine a first time difference between the first output audio sound and the second output audio sound based on the auto-correlation signal; and
send a timing adjustment message including information indicative of the first time difference to a first source of the first audio signal input.

16. The computing device of claim 15, in which the at least one processor is further configured to:
determine a timing adjustment to configure a controller of the first source to delay the first audio signal input to reduce the first time difference,
wherein the information indicative of the first time difference comprises the timing adjustment.

17. The computing device of claim 16, in which the at least one processor is further configured to:
sense, in the combined audio signal, a first source-specific sound in the first output audio sound; and
identify the first output audio sound based on the sensing of the first source-specific sound,
wherein the at least one processor is configured to determine the timing adjustment based in part on having identified the first output audio sound.

18. The computing device of claim 15, in which the at least one processor is further configured to:
acquire a first video output from a first video display by a camera, wherein the first video output is based on a first video signal input to the first video display;
determine a second time difference between the first video output and the second output audio sound;
determine a second timing adjustment that reduces the second time difference between the first video output and the second output audio sound; and
send the timing adjustment message including the second timing adjustment to a source of the first video output.

19. The computing device of claim 15, in which the at least one processor is further configured to:
determine, after sending the timing adjustment message, a second time difference between the first output audio sound and the second output audio sound as received in the combined audio signal from the microphone, the second time difference being less than the first time difference.

20. The computing device of claim 15, wherein the auto-correlation signal has a plurality of peaks in magnitude over time, the plurality of peaks including a first peak and at least one offset peak shifted in time relative to the first peak, and the at least one processor is further configured to:
select a second peak of the at least one offset peak that has a largest magnitude of the at least one offset peak; and
determine the first time difference between the first peak and the second peak, the first time difference corresponding to the first time delay.

* * * * *